United States Patent [19]

Mosley, Jr. et al.

[11] Patent Number: 4,538,280
[45] Date of Patent: Aug. 27, 1985

[54] COHERENT SPREAD SPECTRUM PSEUDONOISE TRACKING LOOP

[75] Inventors: William H. Mosley, Jr., St. Petersburg; Carl F. Andren, Indiatlantic, both of Fla.

[73] Assignee: E-Systems, Inc., Dallas, Tex.

[21] Appl. No.: 492,021

[22] Filed: May 5, 1983

[51] Int. Cl.$^3$ ............................................. H03D 1/22
[52] U.S. Cl. ........................................ 375/1; 329/50; 329/122; 375/96
[58] Field of Search ................. 375/1, 85, 96, 97, 115; 370/107; 329/50, 124, 122; 328/155; 343/5 PN, 378

[56] References Cited

U.S. PATENT DOCUMENTS

| | | | |
|---|---|---|---|
| 4,313,205 | 1/1982 | Rhodes | 375/85 |
| 4,351,064 | 9/1982 | Ewanus | 375/1 |
| 4,470,145 | 9/1984 | Williams | 375/77 |

*Primary Examiner*—Benedict V. Safourek
*Attorney, Agent, or Firm*—Albert M. Crowder, Jr.

[57] ABSTRACT

A detector (20) is provided for use in a communication receiver where a received spread spectrum data signal is detected using a locally generated reference signal to decode the data signal. The detector (20) includes first (22) and second channels (24) and circuitry (90) for applying the received encoded data signal to the first (22) and second channels (24). A local generator (50) is provided for generating the reference signal wherein the reference signal has polarity transitions. A demodulator (40) is included in the first channel (22) for generating a detected recovered data signal from the received data signal in response to the reference signal. Circuitry (52) is provided for detecting the polarity transitions in the reference signal and for generating a differential PN signal. Circuitry (42) is further provided in the second channel (24) for correlating the received data signal and the differential PN signal to thereby generate a recovered error signal. The recovered data signal and the recovered error signal are correlated by circuitry (58) to generate a control signal for application to the local generator (50) for locking the reference signal to a component of the received data signal.

35 Claims, 20 Drawing Figures

COHERENT SPREAD SPECTRUM PSEUDONOISE TRACKING LOOP

BACKGROUND ART

The U.S. Government has rights in this invention pursuant to Contract No. F3062-78-C-0066 awarded by the Department of the Air Force.

TECHNICAL FIELD

This invention relates to spread spectrum communications systems, and more particularly, to a spread spectrum receiver including a pseudonoise tracking loop for locking a locally generated pseudonoise bit sequence to a received signal containing the the same pseudonoise bit sequence.

Spread spectrum communications systems utilize a transmission bandwidth which is several times larger than the bandwidth of the data or information to be transmitted in order to achieve jam resistant communication. Such systems utilize multipath signal rejection and have a low probability of unauthorized signal detection. In a spread spectrum communications system, a spread spectrum transmitter generates a data modulated signal wherein the energy of the modulated signal is spread over a frequency band that is considerably wider than the frequency band of the data. Generally, this modulation is accomplished with a carrier signal that is first phase modulated by an information or data signal, of a relatively narrow bandwidth, and then phase modulated by a wide bandwidth signal such as a pseudonoise (PN) signal. The high rate pseudonoise binary code causes noise-like spreading of the information signal to both disguise the waveform to minimize interception of the communications and also to provide a method of achieving processing gain against intentional jamming sources which would seek to disrupt the communications.

Within a spread spectrum receiver, the received spread spectrum signal is correlated against a signal corresponding to the modulating PN sequence signal utilized in the transmitter. The PN demodulation process differs from conventional phase lock loop demodulation of phase shift keyed (PSK) waveforms in that the spread spectrum receiver has apriori knowledge of the PN sequence and must maintain alignment between the locally generated PN sequence and the incoming PN sequence. No information as such is carried in the PN sequence. The demodulation process to recover the PN sequence requires synchronization of the local PN sequence, generated in the receiver, to the PN sequence component incorporated in the received modulated signal, generated in the transmitter. It is therefore necessary that the local PN sequence be locked to the received PN sequence for proper operation of the spread spectrum communications system.

Previously developed techniques for locking the local PN sequence to the received PN sequence made use of the delay lock loop which utilizes three intermediate frequency amplifier and demodulator sections to process the necessary information. One intermediate frequency channel is demodulated with the PN sequence currently aligned with respect to the incoming data signal. One of the other two channels is operated with the PN sequence early, in time, with respect to the incoming signal and the other with a PN sequence operated late, in time, with respect to the incoming signal by the amount of, for example, one-half of a PN bit. By combination of the output of the early and late channels in a subtractor, an S curve is obtained which allows a null seeking loop to maintain PN sequence synchronization. All data demodulation is performed in the first channel. This technique using three despreading paths is a relatively complex system having two error paths which must have balanced gains.

Another previously developed lock system is the Tau Jitter PN loop. The Tau Jitter loop operates with a single intermediate frequency channel that is despread utilizing a PN sequence which is dithered at a low frequency in order to determine the optimum lock point. The intermediate frequency channel output is synchronously demodulated with respect to the dither frequency to determined if the PN sequence is aligned properly. To prevent undue reduction of the desired signal, the dither amplitude must be controlled at a low level. This results in a small PN error signal and thus the Tau Jitter PN loop must operate at a low signal-to-noise ratio. The bandwidth of the Tau Jitter loop is usually reduced to increase the loop signal-to-noise ratio to an acceptable value. Such operation, however, produces an undesirable increase in acquisition time. Although the Tau Jitter loop operates with a single channel and is less complex than the delay lock loop system, its simplicity does not compensate for the decrease in system performance over the delay lock loop.

Still another previously developed system is described in U.S. Pat. No. 4,122,393 issued to Gordy et al on Oct. 24, 1978 and entitled "Spread Spectrum Detector" in which two channels are utilized in the PN sequence locking operation.

Such previously developed PN tracking loops have therefore suffered from poor signal-to-noise ratios in the PN loop or suffer from excessive complexity. A need has thus arisen for a PN loop for a spread spectrum receiver providing an improved signal-to-noise ratio without degrading the data error performance of the loop. A need has further arisen for a PN loop that is simple and reliable in operation to minimize the complexities associated with the delay lock loop system.

DISCLOSURE OF THE INVENTION

In accordance with the present invention, a pseudonoise tracking loop for use in a spread spectrum communications system is provided which substantially eliminates or reduces the problems heretofore present in prior pseudonoise tracking loops.

In accordance with the present invention, a detector is provided for use in a communication receiver where a received spread data signal at baseband is detected using a locally generated reference signal to despread the spread data signal. The detector comprises first and second channels and circuitry for applying the received spread data signal to the first and second channels. A local pseudonoise generator is provided for generating the reference signal that includes polarity transitions. A demodulator is included in the first channel for generating a recovered data signal from the received spread data signal by correlation with the reference signal. Circuitry is provided for detecting the polarity transitions in the reference signal and for generating a differentiated PN signal. Circuitry is further provided for correlating in the second channel the received spread data signal and the differential PN signal to thereby generate a recovered error signal. The recovered data signal and the recovered error signal are correlated to thereby generate a control signal for application to the local generator for locking the reference PN signal to the spread component of the received spread data signal.

In accordance with another aspect of the present invention, in a receiver for a spread spectrum signal, wherein the spread spectrum signal includes a carrier signal that has been phase modulated by a data signal and by a pseudonoise signal, a detector is provided and includes first and second channels. Circuitry as a part of the detector applies the spread spectrum signal to the first and second channels. A local generator generates a pseudonoise sequence signal having phase transitions which correspond to the pseudonoise signal component of the received spread spectrum signal. A demodulator is included in the first channel for correlating the pseudonoise signal component of the received spread spectrum signal with the pseudonoise sequence signal generated by the local generator to thereby generate a detected recovered signal. Circuitry as a part of the detector determines the polarity of the phase transitions of the pseudonoise sequence signal and generates a differentiated PN signal. Circuitry is further provided for correlating the received spread spectrum signal and the differentiated PN signal to thereby generate a recovered error signal. Circuitry is further provided for correlating the recovered data signal and the recovered error signal to thereby generate a control signal. The control signal is applied to the local generator for controlling the phase of the pseudonoise signal sequence to lock the phase of the pseudonoise sequence signal to the phase of the pseudonoise signal component of the received spread spectrum signal.

In accordance with another aspect of the present invention, there is provided a method of detecting a received spread data signal using a locally generated reference signal. The received spread data signal is applied to first and second channels. A local reference signal is generated having polarity transitions which correspond to the PN component of the received spread signal at a frequency controlled by a control signal. The spread data signal is demodulated in response to the local reference signal to thereby generate a detected data signal. The polarity transitions in the reference signal are detected using a differentiating process to thereby generate a differential PN signal. The received spread data signal and the differential PN signal are correlated within the second channel to generate a recovered error signal. The recovered data signal and the recovered error signal are correlated to thereby generate the control signal.

BRIEF DESCRIPTION OF DRAWINGS

For a more complete understanding of the present invention and for further advantages thereof, reference is now made to the following Detailed Description taken in conjunction with the accompanying Drawings.

Referring to the drawings:

FIGS. 4a–h illustrates the pseudonoise sequence and waveforms generated in the operation of the pseudonoise locked loop of the present invention illustrated in FIG. 2;

FIGS. 6a–h illustrates the pseudonoise sequence and waveforms generated in the operation of the pseudonoise locked loop of the present invention illustrated in FIG. 5.

DETAILED DESCRIPTION

Figure 1:
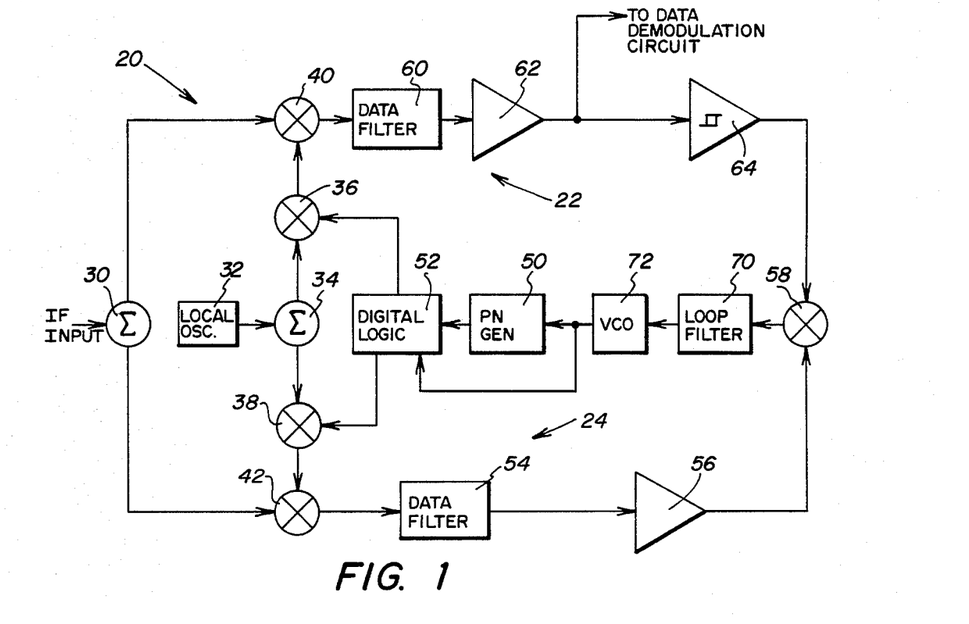
FIG. 1 is a block diagram of a pseudonoise locked loop wherein the received spread spectrum signal is in the intermediate frequency range.

Referring to FIG. 1, a block diagram of the present pseudonoise locked loop is illustrated and is generally identified by the numeral 20. Pseudonoise locked loop 20 includes a data channel, generally identified by the numeral 22, and an error channel, generally identified by the numeral 24. FIG. 1 illustrates the present pseudonoise locked loop 20 for operation with an intermediate frequency (IF) input signal. The spread spectrum pseudonoise (PN) signal is generated at a transmitter (not shown) in a manner well-known to those skilled in the art. Such a transmitter is described in U.S. Pat. No. 4,122,393, which description is incorporated herein by reference. The PN spread signal may comprise, for example, a 70 MHz signal which is applied to a power divider 30. Power divider 30 applies the PN spread signal to data channel 22 and error channel 24. Data channel 22 functions to remove the PN sequence from the PN spread data signal by mixing the PN spread signal with a locally generated PN sequence modulated onto a load oscillator signal.

A local oscillator 32 operating at, for example, 90 MHz is utilized to translate the input PN spread signal to a lower IF frequency, such as, for example, 20 MHz. A power divider 34 receives the output of local oscillator 32. The outputs of power divider 34 are applied to mixers 36 and 38. The output of mixer 36 is applied to a mixer 40 which also receives the PN spread signal from power divider 30. The output of mixer 38 is applied to a mixer 42 which also receives the output of power divider 30, such that a translated PN error signal is applied to error channel 24.

Error channel 24 operates to lock a local PN sequence that is the same as the PN sequence generated by a PN generator within the spread spectrum transmitter (not shown) except that the locally generated PN sequence, absent loop controls, is asynchronous with respect to the PN sequence component in the received spread spectrum signal. The local PN sequence must therefore be varied, or swept, in phase until it is synchronized with the PN modulation component of the spread spectrum signal received by power divider 30. When the phase relationships between the locally generated PN sequence and the PN modulation component of the spread spectrum signal are the same, the signals are said to be in a "locked" condition.

Error channel 24 includes a PN generator 50 which generates a PN bit sequence of alternating polarities. A digital logic circuit 52 receives the output of PN generator 50. Digital logic circuit 52 functions to determine the polarity of PN bit transitions of the PN sequence generated by PN generator 50. Digital logic circuit 52, as will subsequently be described with reference to FIG. 2, functions to differentiate the PN sequence generated by PN generator 50. One output of digital logic circuit 52 is a differentiated PN signal which is applied to mixer 38 to be mixed by mixer 42 with the incoming spread spectrum signal. The differential PN signal output from the mixer 38 consists of positive and negative phase bursts of the local oscillator signal which bracket each incoming PN transition of the received spread spectrum signal, such that the transition occurs in the middle of a polarity pulse of the PN sequence generated by logic circuit 52. The recovered error signal generated by mixer 42 is applied to a data filter 54 whose output is amplified by an amplifier 56. The output of amplifier 56 is applied to a mixer 58.

The output of PN generator 50 is also applied to mixer 36 whose output is applied to mixer 40 for demodulation with the received spread spectrum signal from power divider 30 for removal of the PN sequence component of the received spread spectrum signal. The output of mixer 40 is applied to a data filter 60 having an output connected to amplifier 62. The output of amplifier 62 is applied to a data demodulation circuit (not shown) in which the carrier and data are subsequently demodulated in a manner well-known to those skilled in the art. The output of amplifier 62 represents a recovered data modulated IF signal which is amplified by a limiter 64 for application to mixer 58.

Because the recovered error signal at the output of mixer 42 is modulated with the received data, the polarity of the recovered error signal is incorrect one-half of the time. The recovered error signal is therefore filtered by data filter 54 and mixed with the recovered data signal applied from limiter 64 to mixer 58 to synchronously remove the polarity ambiguity and the IF component. Mixer 58 functions to demodulate the recovered error signal and remove the data modulation present within the recovered error signal.

The recovered error signal is then applied to a loop filter 70 having an output applied to a voltage controlled oscillator (VCO) 72. The output of voltage controlled oscillator 72 is applied to PN generator 50 to control the phase of the PN generator. Voltage controlled oscillator 72 may comprise, for example, a variable oscillator such as a voltage controlled crystal oscillator and is used to clock PN generator 50.

Figure 2:
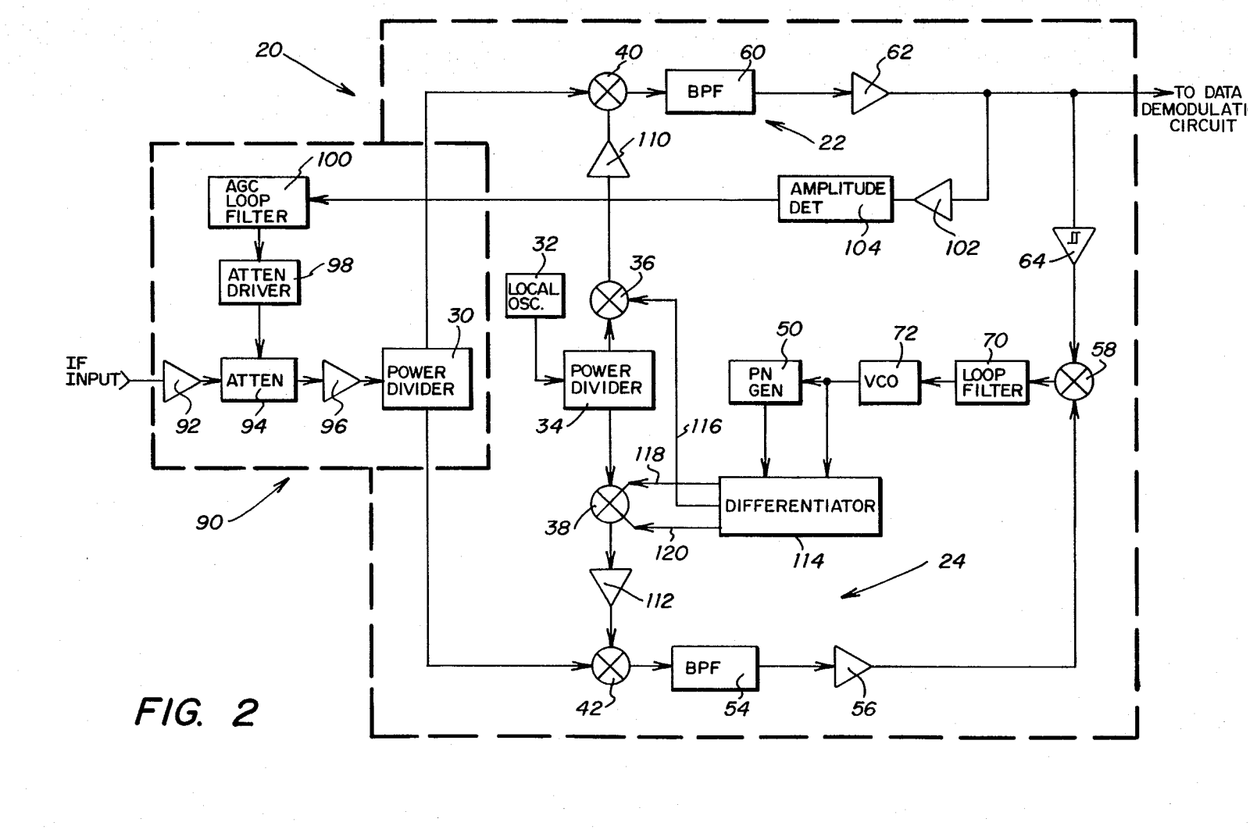
FIG. 2 is a detailed block diagram of the pseudonoise locked loop of the present invention illustrated in FIG. 1.

Referring now to FIG. 2, a more detailed block diagram of the present pseudonoise locked loop 20 of FIG. 1 is illustrated wherein like numerals are utilized for like and corresponding components previously identified. The PN spread signal is applied to power divider 30 through a receive circuit, generally identified by the numeral 90. Receive circuit 90 includes an amplifier 92 which receives the input signal for application to an attenuator 94. The output of attenuator 94 is applied through an amplifier 96 to a power divider 30. Attenuator 94 is driven by an attenuator driver 98 which receives an input from an automatic gain control (AGC) loop filter 100.

The output of amplifier 62 in the data channel 22 of pseudonoise locked loop 20 includes an automatic gain control (AGC) loop for controlling the signal level of the input PN signal to power divider 30. The output of amplifier 62 is applied to an amplifier 102 whose output is applied to an amplitude detector 104. The output of amplitude detector 104 is applied to AGC loop filter 100 within receive circuit 90.

FIG. 2 also illustrates the use of amplifiers 110 disposed between mixer 36 and mixer 40, and an amplifier 112 disposed between mixer 38 and mixer 42 for signal amplification prior to mixing with the PN encoded signal. Amplifiers 56, 62, 110 and 112 and limiter 64 may comprise, for example, Models MWA 110 amplifiers. Power divider 34 may comprise, for example, Model DS-109 power divider. Mixers 36, 38, 40, 42 and 58 may comprise, for example, Model SRA-1 double-balanced mixers manufactured and sold by Mini-Circuits Laboratory, Brooklyn, N.Y. Alternatively, in a baseband embodiment, mixers 36, 38, 40, 42 and 58 may comprise, for example, Exclusive OR gates or modulo-2 adders.

Within the digital logic circuit 52 (FIG. 1) is a differentiator 114 which receives the output of VCO 72 and PN generator 50. The PN bit sequence, generated by PN generator 50, is applied through differentiator 114 via signal line 116 to mixer 36 for application to data channel 22. Prior to application of the PN bit sequence generated by PN generator 50 to differentiator 114, the PN bit sequence is delayed by one PN bit so that both the present and next succeeding PN bit are available to differentiator 114. Differentiator 114 functions to detect transitions within the PN bit sequence generated by PN generator 50. The PN bit sequence comprises a sequence of minus 1 and plus 1 logic states resulting in four possible combinations of two adjacent bits. Adjacent bits may be of the same state, either both low states or both high states, or of different states in which a high state follows a low state or a low state follows a high state. When the differentiator 114 detects a transition from a high state to a low state, a negative output is applied via signal lines 118 and 120 to mixer 38. A transition from a low state to a high state results in a positive output of the differentiator 114 applied via signal lines 118 and 120 to mixer 38. Where no transition in the PN bit sequence is detected by differentiator 114, a zero differential output is applied to mixer 38.

The positive or negative output of differentiator 114 represents a differential PN signal which when mixed with the PN spread signal by mixer 42 generates a recovered error signal or a DC voltage for application to voltage controlled oscillator 72 for shifting the phase of the generated PN bit sequence generated by PN generator 50. The differential PN signal generated by operation of differentiator 114 is delayed by one-half bit prior to application to mixer 42. Where a transition in the PN bit sequence, detected by differentiator 114, occurs in time other than the middle of a PN bit of the incoming PN encoded signal, either early in time or late in time, the output of mixer 42 will cause the PN bit sequence generated by PN generator 50 to shift in the positive or negative direction such that the PN bit sequence generated by PN generator 50 is locked to the input PN encoded bit sequence.

Figure 3:
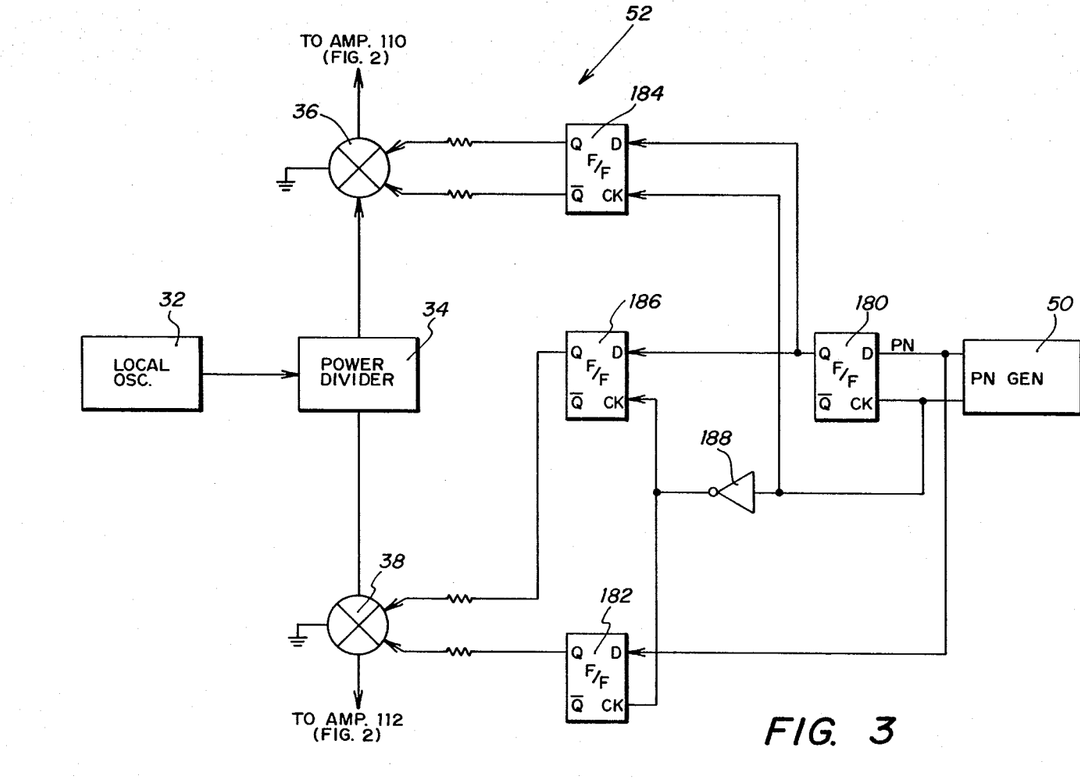
FIG. 3 is a detailed schematic diagram illustrating the digital logic circuitry of the pseudonoise locked loop of the present invention shown in the block diagram of FIG. 1.

Referring to FIG. 3, there is shown schematic circuitry for the digital logic 52 (FIG. 1) wherein like numerals are utilized for like and corresponding components previously identified. The output of PN generator 50 is applied to flip-flops 180 and 182. The output of flip-flop 180 is applied to flip-flops 184 and 186. The output of PN generator 50 also provides clocking signals for flip-flops 180 and 184, and through an inverter 188 to flip-flops 182 and 186. Flip-flop 184 applies opposite outputs to mixer 36. The outputs of flip-flops 186 and 182 are applied to mixer 38.

Referring to FIGS. 4a–4h, there is illustrated waveforms generated during the operation of the present pseudonoise locked loop 20. FIG. 4a illustrates the modulation pattern of the PN bit sequence generated by PN generator 50 (FIG. 1). FIG. 4b represents the output signal on lines 118, 120 of digital logic circuit 52 (FIG. 1) and may be generally described as the differential of the PN bit sequence (FIG. 4a) generated by PN generator 50. The PN reference signal on line 116 is illustrated in FIG. 4c and represents the modulation pattern of the PN bit sequence in the PN signal received by mixer 36 (FIG. 2). FIGS. 4d, 4e and 4f represent the error pattern of PN bit sequences received by the loop filter 70 where the sequence occurs on time, slightly late and slightly early with respect to the PN bit sequence component of the spread spectrum signal. It can be seen that where the generated PN bit sequence is slightly late, FIG. 4e, there is more energy in the negative direction than in the positive direction represented by long negative pulses and narrow positive pulses. Similarly, where the PN bit sequence generated by PN generator 50 is earlier than the PN sequence component of the receive spread spectrum PN encoded signal (FIG. 4f), more energy is present in the positive direction wherein longer positive pulses are present. Where the PN bit sequence is on time and corresponds to the PN sequence component of the received PN encoded signal, there is an equal balance between the positive and negative energy levels. It can also be seen that when the data component is in the negative state, the error signal is inverted. The mixer 58 corrects for this inversion.

FIG. 4g represents the averaged output signal of mixer 42 (FIG. 1) in the time offset domain. This pattern represents a voltage which varies as the phase of the PN bit sequence generated by PN generator 50 and is shifted from a minus one PN bit offset relative to the received PN bit to a plus one bit offset. This DC generated signal controls the voltage controlled oscillator 72 (FIG. 1).

FIG. 4h illustrates the averaged output of mixer 40 (FIG. 1) representing the amplitude of the data channel as the PN bit sequence generated by PN generator 50 is shifted in relative phase from minus one bit to plus one bit.

Figure 5:
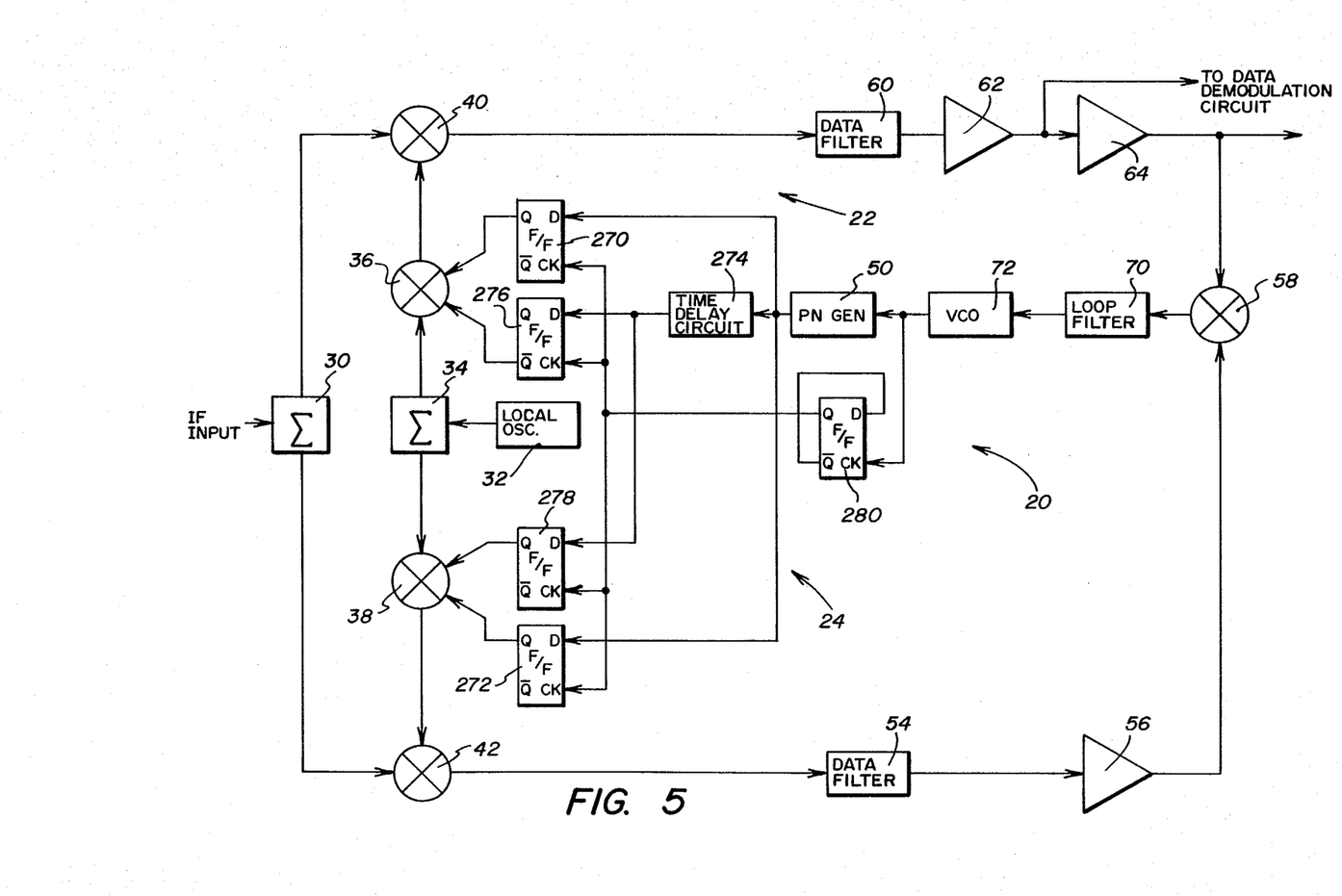
FIG. 5 is a block diagram of an extended lock range embodiment of the pseudonoise locked loop of the present invention.

FIG. 5 illustrates another embodiment of the present invention in which extended correlation of more than one PN bit of the PN bit sequence is achieved. As previously described, PN locked loop 20 correlates over one PN bit of the PN bit sequence and multiplies the derived error signal by the correlated output. However, by correlating over more than one bit, a greater lock-in capability can be acheived utilizing the present invention. By sampling the PN bit sequence from PN generator 50 at one-half of the bit rate, PN locked loop 20 samples the occurrence of two adjacent logic bit "1's" followed or preceded by two adjacent logic bit "0's" in the PN bit sequence. Successive pairs of PN bits are sampled and correlation takes place on only those pairs which are either both ones or both zeros. For those pairs which are not both ones or both zeros, no correlation with the incoming signal is attempted.

Additionally, by using the present invention, the number of PN bits can be extended to increase the lock-in capability of the present invention. Digital logic circuit 52 (FIG. 1) can also determine if there is an unbalanced number of ones and zeros and correlate with reduced weight on those situations where such an unbalance exists. If, for example, correlation took place over a five bit length, a one bit unbalance, a three bit unbalance or a five bit unbalance can be utilized. These unbalances can be correlated with appropriate weighting factors to recover some of the energy otherwise disregarded in the correlation process.

FIG. 5 illustrates the present invention wherein successive pairs of PN bits are utilized in the correlation process. Like numerals are utilized for like and corresponding components previously identified with respect to FIGS. 1 and 2. In operation, the width of the correlation pulse is extended by a factor of two and only two adjacent bits are sampled over the PN bit sequence in contradistinction to the present PN locked loop 20 of FIG. 2. The output of PN generator 50 is applied to flip-flop 270 and 272 and to a time delay circuit 274. The output of time delay circuit 274 is applied to flip-flops 276 and 278. Flip-flops 270 and 276 apply opposite outputs to mixer 36. Flip-flops 272 and 278 apply outputs to mixer 38. When the contents of flip-flops 270 and 276 or the contents of flip-flops 272 and 278 are identical, wherein these flip-flops contain both ones or both zeros, an output is supplied to mixer 36 but not to mixer 38. When flip-flops 270 and 276 or 272 and 278 contain different information, and output is supplied to mixer 38 but not to mixer 36. Therefore, it can be seen when successive two bit pairs from PN generator 50 are different, mixer 38 will receive current and when successive two bit pairs of the PN bit sequence generated by PN generator 50 are the same, no input will be applied to mixer 38.

An output of voltage controlled oscillator 72 is applied to a flip-flop 280 to generate a clock signal for flip-flops 270, 272, 276 and 278 at a clocking rate of one-half that of the clocking rate utilized in the embodiment of the present PN locked loop 20, shown in FIGS. 1 and 2.

Figure 4:
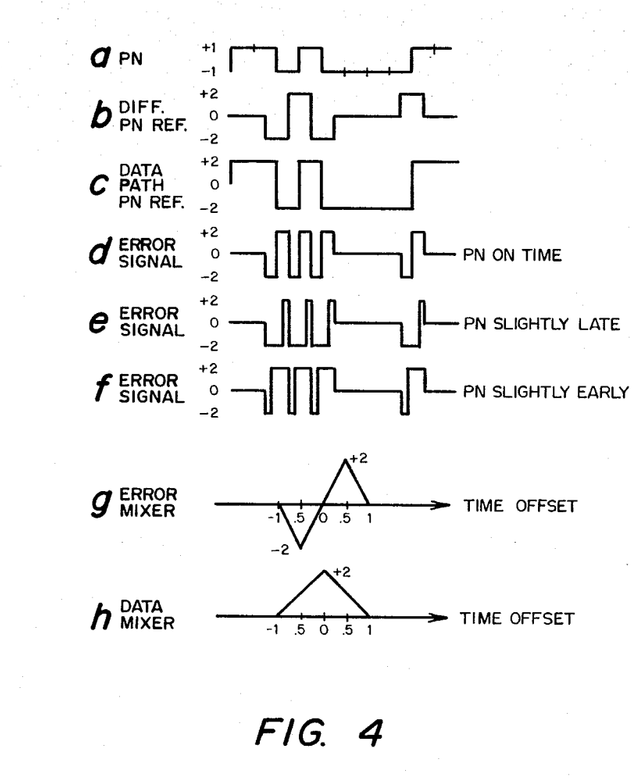
Figure 6:
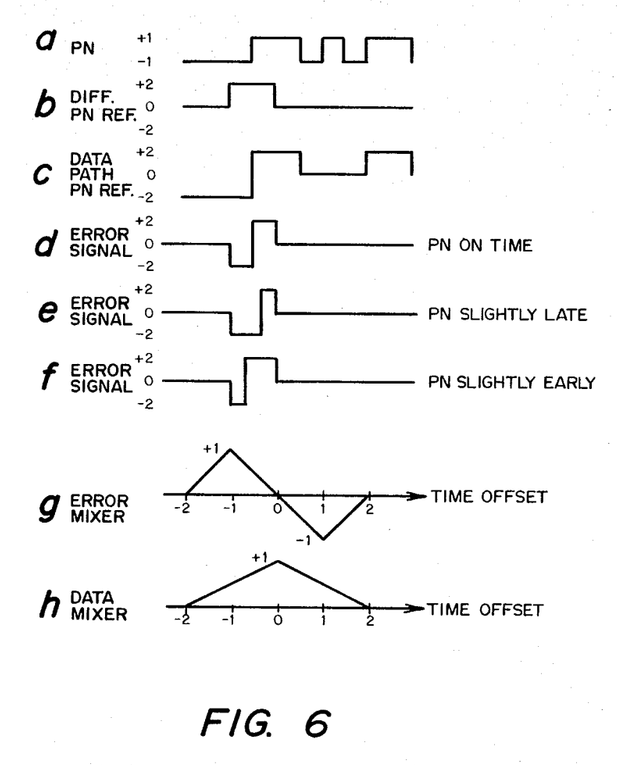

FIG. 6 illustrates the pseudonoise sequence and waveforms corresponding to the waveforms illustrated in FIG. 4 for the operation of the present pseudonoise locked loop 20, as illustrated in FIG. 5. It can be seen that the width of the correlation pulse is increased by a factor of two over the width of the correlation pulse shown in FIG. 4 in addition to the fact that two adjacent bits are sampled in the PN bit sequence.

It therefore can be seen that the present invention provides for a PN locked loop for a spread spectrum receiver with increased and improved signal-to-noise ratio without degrading the data error performance of the loop. The present PN locked loop is simple in construction and reliable in operation to minimize the complexities associated with previously developed locked loop systems. The present invention further provides substantial protection against jamming of the received PN spread data or information.

Whereas the present invention has been described with respect to specific embodiments thereof, it will be understood that various changes and modifications will be suggested to one skilled in the art, and it is intended to encompass such changes and modifications as fall within the scope of the appended claims.

We claim:

1. A detector for use in a communication receiver where a received data signal is detected using a locally generated reference signal to decode the received data signal comprising:
   first channel means;
   second channel means;
   means for applying the received spread data signal to said first and second channel means;
   local generator means for generating the reference signal wherein the reference signal includes polarity transitions;
   said first channel means including demodulation means for generating a detected recovered data signal from said received spread data signal in response to the reference signal;

means for detecting said polarity transitions in the reference signal and for generating a differential PN signal;

said second channel means including means for correlating the received spread data signal and said differential PN signal to thereby generate a recovered error signal; and means for correlating said recovered data siganl and said recovered error signal to thereby generate a control signal for application to said local generator means for locking the reference signal to a component of the received spread data signal.

2. The detector of claim 1 and further including:
means for filtering said control signal prior to application of said control signal to said local generator means.

3. The detector of claim 1 wherein said local generator means includes:
pseudonoise signal generator means for generating a pseudonoise sequence signal which corresponds to a pseudonoise signal component of the received spread data signal.

4. The detector of claim 3 wherein the phase of said pseudonoise signal generated by said pseudonoise signal generator means is controlled by said control signal.

5. The detector of claim 3 wherein said local generator means further includes:
voltage controlled oscillator means responsive to said control signal for clocking said pseudonoise signal generator means.

6. The detector of claim 1 wherein said means for detecting the polarity transitions in the reference signal comprises means for differentiating the reference signal.

7. The detector of claim 6 wherein said means for differentiating includes double balance mixer means.

8. The detector of claim 1 wherein said first channel means further includes:
data filter means for filtering said detected recovered data signal.

9. The detector of claim 1 wherein said second channel means further includes:
data filter means for filtering said recovered error signal.

10. The detector of claim 1 wherein the received spread data signal comprises baseband frequency data.

11. The detector of claim 1 wherein the received spread data signal comprises intermediate frequency data.

12. In a receiver for a spread specturm encoded signal wherein the received spread spectrum signal includes a carrier signal that has been phase modulated by a data signal and by a pseudonoise signal, a detector comprising:
first channel means;
second channel means;
means for applying the received spread spectrum signal to said first and second channel means;
local generator means for generating a pseudonoise sequence signal having phase transitions which corresponds to the pseudonoise signal component of the received spread spectrum signal;
said first channel means including demodulation means for correlating the pseudonoise signal component of the received spread spectrum signal with said pseudonoise sequence signal generated by said local generator means to thereby generate a detected recovered signal;

means for detecting the polarity of said phase transitions of said pseudonoise reference signal and for generating a differential PN signal;

means for correlating the received spread spectrum encoded signal and said error signal to thereby generate a recovered error signal; and means for correlating said detected recovered signal and said recovered error signal to therby generate a control signal for application to said local generator means, wherein said control signal controls the phase of said pseudonoise signal sequence such that said phase of said pseudonoise signal sequence generated by said local generator means is locked to the phase of the pseudonoise signal component of the received spread spectrum signal.

13. The detector of claim 12 wherein said local generator means further includes:
voltage controlled oscillator means responsive to said control signal for clocking said local generator means.

14. The detector of claim 12 wherein said means for determining the polarity of said phase transitions of said pseudonoise sequence signal comprises:
means for differentiating the pseudonoise sequence signal.

15. The detector of claim 14 wherein said means for differentiating includes double balance mixer means.

16. The detector of claim 12 wherein said first channel means further includes:
data filter means for filtering said detected recovered signal.

17. The detector of claim 12 wherein said second channel means further includes:
filter means for filtering said recovered error signal.

18. The detector of claim 12 wherein said means for determining the polarity of said phase transitions of said pseudonoise sequence signal samples each pseudonoise sequence bit of said pseudonoise sequence signal to determine polarity transitions between pseudonoise sequence bits.

19. The detector of claim 12 wherein said means for determining the polarity of said phase transitions of said pseudonoise sequence signal samples every other pseudonoise sequence bit of said pseudonoise sequence signal to determine polarity transitions between successive pairs of pseudonoise sequence bits.

20. The detector of claim 12 wherein said means for determining the polarity of said phase transitions of said pseudonoise sequence signal samples a plurality of pseudonoise sequence bits of said pseudonoise sequence signal to determine polarity transitions between multiple pseudonoise sequence bits.

21. A detector for use in a communication receiver for a spread spectrum signal wherein the signal is modulated by a data signal and by a pseudonoise signal and detected by a locally generated pseudonoise reference signal, comprising:
data channel means;
error channel means;
means for applying the spread spectrum signal to said data channel means and to said error channel means;
voltage controlled oscillator means for generating a local pseudonoise sequence signal having phase transitions which correspond to the pseudonoise signal component of the spread spectrum signal;

said data channel means including demodulation means for removing the pseudonoise signal component of the spread spectrum signal in response to said local pseudonoise sequence signal to thereby generate a partially recovered signal;

filter means for receiving said partially recovered signal and for generating a recovered signal;

differentiating means for determining phase transitions in said local pseudonoise sequence signal and for generating a differential PN signal in response to detected phase transitions;

said error channel means including first mixer means for correlating the spread spectrum signal and said differential PN signal to generate a recovered error signal;

said error channel means including filter means for filtering said recovered error signal;

second mixer means for synchronizing the phase of said recovered error signal with the phase of the recovered signal and for removing the data signal component of said error signal to thereby generate a control signal; and means for applying said control signal to said voltage controlled oscillator means for locking said pseudonoise sequence signal generated by said voltage controlled oscillator means to the pseudonoise signal component of the spread spectrum signal.

22. The detector of claim 21 wherein said demodulation means includes:
double balance mixer means.

23. The detector of claim 21 wherein said differentiating means includes:
double balance mixer means.

24. The detector of claim 21 wherein said means for applying said control signal to said voltage controlled oscillator means includes:
means for filtering said control signal; and
clock means for receiving said filtered control signal to clock said voltage controlled oscillator means.

25. The detector of claim 21 wherein said spread spectrum signal comprises a baseband frequency signal.

26. The detector of claim 21 wherein said spread spectrum signal comprises an intermediate frequency signal and said means for applying the spread spectrum signal to said data channel means and said error channel means includes means for translating said intermediate frequency prior to application to said channel means.

27. The detector of claim 21 and further including:
mean for delaying the application of said local pseudonoise sequence signal to said differentiating means by a predetermined number of pseudonoise sequence bits, such that the present pseudonoise sequence bit and the next succeeding pseudonoise sequence bit are applied to said differentiating means.

28. The detector of claim 27 wherein said means for delaying the application of said local pseudonoise sequence signal delays said local pseudonoise sequence signal by one pseudonoise sequence bit.

29. The detector of claim 21 and further including:
mean for delaying the application of said error signal to said first mixer means by a predetermined number of pseudonoise sequence bits, such that a transition in said local pseudonoise sequence signal occurs within a pulse width of said error signal.

30. A method of detecting a received data signal using a local generated reference signal comprising:
applying the received spread data signal to first and second channels;
generating the local reference signal having polarity transitions in response to a control signal;
demodulating within the first channel the received data signal in response to the local reference signal thereby generating a detected data signal;
detecting the polarity transitions in the local reference signal thereby generating a differential PN signal;
correlating within the second channel the received data signal and the differential PN signal thereby generating a recovered error signal; and
correlating the detected data signal and the error signal thereby generating the control signal.

31. The method of claim 30 and further including:
filtering the control signal.

32. The method of claim 30 and further including:
generating a pseudonoise sequence signal which corresponds to a pseudonoise signal component of the received data signal.

33. The method of claim 30 wherein the step of detecting the polarity transitions in the local reference signal includes differentiating the local reference signal.

34. The method of claim 30 and further including:
filtering the recovered data signal prior to correlation with the error signal.

35. The method of claim 30 and further including:
filtering the error signal prior to correlation with the recovered data signal.

* * * * *